PREDETECTION SIGNAL PROCESSING SYSTEM
Filed July 1, 1966 4 Sheets-Sheet 1
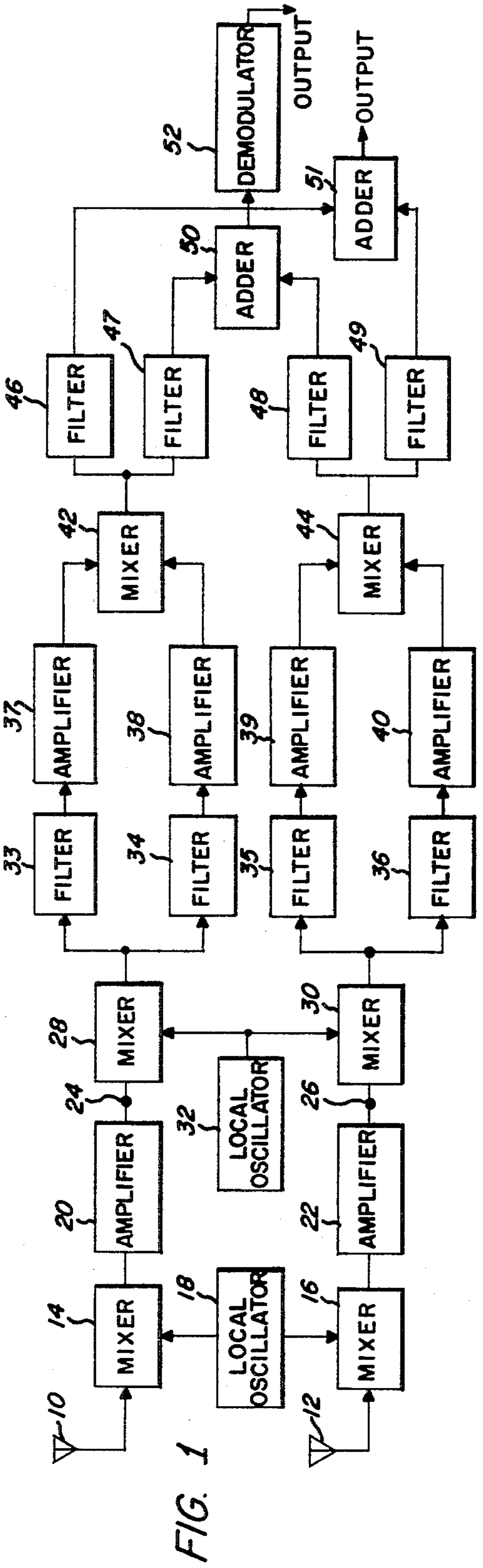
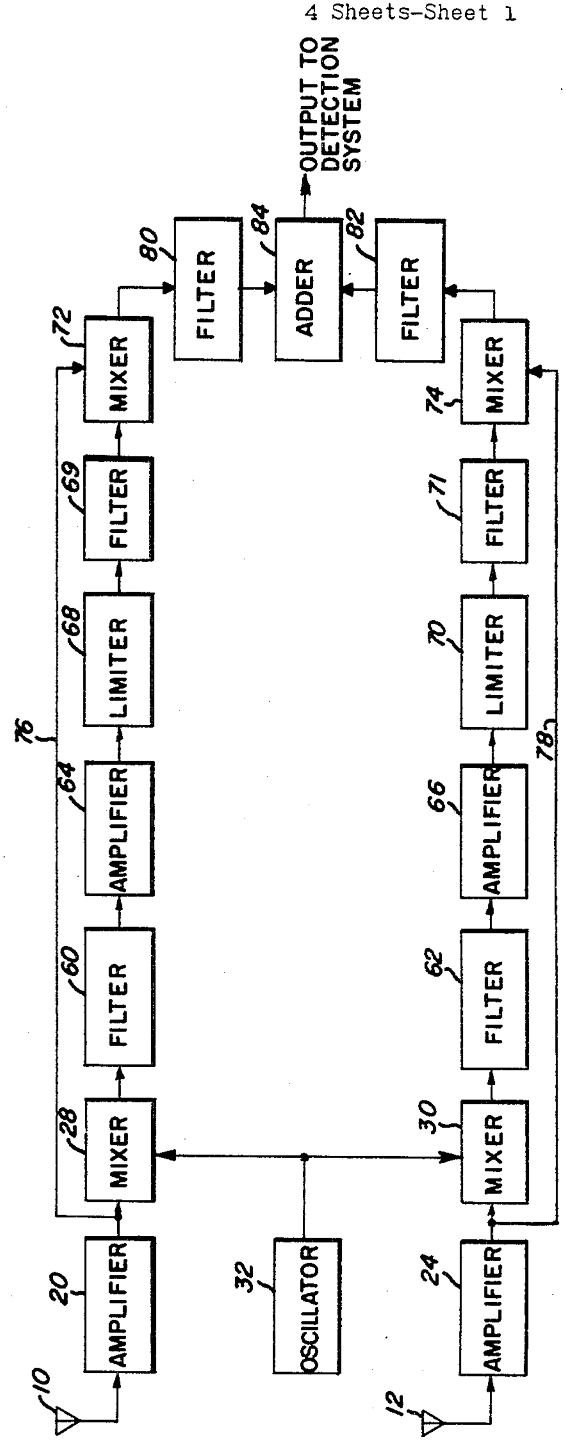
FIG. 2
INVENTORS
WILLIAM J. BICKFORD
HOWARD J. ROWLAND
BY Herbert W. Arnold
ATTORNEY INVENTORS
WILLIAM J. BICKFORD
HOWARD J. ROWLAND
BY Herbert W. Arnold
ATTORNEY INVENTORS
WILLIAM J. BICKFORD
HOWARD J. ROWLAND
BY Herbert W. Arnold
ATTORNEY

PREDETECTION SIGNAL PROCESSING SYSTEM

Filed July 1, 1966 4 Sheets-Sheet 4

INVENTORS
WILLIAM J. BICKFORD
HOWARD J. ROWLAND
BY Herbert W. Arnold
ATTORNEY 3,471,788

PREDETECTION SIGNAL PROCESSING SYSTEM

William J. Bickford, Weston, and Howard J. Rowland, Newton, Mass., assignors to Raytheon Company, Lexington, Mass., a corporation of Delaware Filed July 1, 1966, Ser. No. 562,375
Int. Cl. H04b 1/26, 1/16
U.S. Cl. 325—369 10 Claims

ABSTRACT OF THE DISCLOSURE

A signal processing system in which a multiplicity of incoming signals are combined prior to detection. By heterodyning each incoming signal with a common signal, intermediate frequency signals are generated. Each of these intermediate frequency signals have a phase that is equal to but opposite that of the corresponding incoming signal. When each of the incoming signals and their corresponding intermediate frequency signals are beat together, resultant signals are formed and all resultant signals have the same phase and are combined to produce an output signal.

This invention relates to signal processing systems and, more particularly, to a signal processing system which operates on an incoming signal to provide an output signal which is independent of the phase of the input signal and an output signal which bears a specific relationship thereto. Processing apparatus of this sort is particularly useable in connection with diversity receivers which embody a plurality of installations all connected to receive incoming signal energy through connection to antennas which are either spaced apart geographically or which have other characteristics tending to make them generally different in response.

It is frequently desirable to combine signals arriving at two or more points in a manner which provides maximum signal power to a load. However, it is usually difficult to process these signals so as to provide maximum signal power to the load. This is due in part to the fact that phase relationships of the mean frequencies of a given spectrum or the carriers of the incoming signals are generally independent of each other. The addition, therefore, of the two or more of such signals provides an output whose amplitude is dependent upon the vector sum of the incoming signals and results in an output varying as a function of the phase and amplitude relationships of the incoming signals. For example, when signals obtained from each of a plurality of antenna elements are added, the power transfer therefrom depends upon the relative location of each antenna element with respect to the transmitting source. Also, in an antenna array the spacing of elements becomes important, as does the spacing of transducers in an acoustical array. In other instances, the transmission medium may change to bring about undesirable phase differences in the incoming signals to be combined. While under certain conditions phase discrepancies may be corrected to permit maximum signal power transfer to the load, which in some instances may be a diversity receiver, in other cases the transmitting medium and direction of the source may vary in a manner such that phase correction becomes difficult, if not impossible, to achieve.

It is therefore desirable to combine separate signals of differing phase to achieve maximum power transfer to a load, irrespective of the phase relationships of the incoming signals. It is also desirable to combine modulated signals from a common source to achieve maximum power output when such signals are received by a plurality of antenna elements. In other instances, it is required that signals from a plurality of antenna elements be combined in an efficient manner when frequency diversity transmission is employed. Finally, it may be desirable to combine in an efficient manner individual signals which contain the same information when received irrespective of the transmission or receiving medium.

In the past it has been customary to provide postdetection combining processes in an effort to achieve the above-recited signal translation functions and at the same time minimize the reception of noise. However, when the predetection signal to noise ratio is such that noise degrades the detection process, postdetection combining, that is combining said signals after detection, no longer yields maximum signal power. Predetection combining can be used to avoid the undesirable results associated with postdetection combining. However, predetection combining requires that the signals to be combined be in phase at any given instant of time and, as a result, is frequently difficult to achieve and requires complex circuitry capable of adjustment to compensate for carrier phase differences. While signals combined by this process provide a more favorable signal to noise ratio at the input to the detection device, the difficulty of adjusting for individual signal phase differences results in complex structure often including a number of phase comparison and feedback control devices. For example, when four signals are to be combined, it is generally necessary to provide at least three servo mechanisms to minimize phase differences of three of the incoming signals relative to one of such signals.

In many instances it is desirable to provide an improved signal processing system in which the phase differences associated with a plurality of incoming signals can be compensated or rendered negligible, said signals later being combined to provide an output signal which exhibits the desirable characteristics associated with, and is particularly adapted to predetection combining, such improved signal characteristics including, for example, signal to noise ratio, form factor, and the like.

It is therefore desirable to provide an improved signal processing system in which the phase differences associated with incoming signals are effectively compensated or rendered negligible so as to provide output signals of like phase which are particularly suited for predetection combining and are substantially independent of the phase of the incoming signals. This arrangement may be conveniently termed a synthetic phase isolator.

In accordance with the signal processing system of the invention, input signals which have unknown and varying phase relationships relative to each other, such as those from a plurality of antenna elements, are heterodyned with another signal, for example, a local oscillator, to produce pairs of beat frequency signals having phase components which bear a fixed relationship to the phase of corresponding input signals. One signal of each pair is beat with the other signal of that pair to provide second pairs of beat frequency signals. One resulting set of signals of the second pairs have phase components substantially in phase opposition, and means is provided for combining the latter set of signals to produce an output signal having a phase substantially independent of the phase of the input signals. The other set of signals of the second pairs of signals have phase components which are substantially double the phase of the input signals, which also can be combined. In the case of multiple antenna elements, the phase of this combined signal varies as if the antenna elements were separted by twice the distance, which configuration is capable of providing a substantially narrower beam for a given array.

The invention further discloses that one signal of each pair of signals produced by the aforementioned first heterodyne process is beat with its corresponding input signal to provide pairs of beat frequency signals having phase components substantially in phase opposition to each other, and means for combining said latter signals to provide a combined output signal having a phase substantially independent of the phase of the input signals.

The invention also discloses the use of the combined output signal, provided by the heterodyne process of the latter paragraph as the heterodyning signal in the first heterodyning signal in the first heterodyning process, thus providing a regenerative feedback loop. Thus, by mixing the output signal prior to detection with the input signal, the input signal carrier and sidebands mix with the output signal carrier and sidebands to provide a heterodyne signal the energy of which is primarily restricted to a single center frequency having an amplitude which is greater than that provided by mixing the same input signal with that of an unmodulated local oscillator. Since the two signals to be mixed are substantially identical except for a displacement in frequency, the energy at the center, or beat frequency, is substantially greater and less energy is present in the form of sidebands. Such process in which the beat frequency signal is mixed by the undetected output may be referred to as a correlation process which provides optimum energy at a single frequency.

Further objectives and advantages of the invention will become apparent from the following specifications taken in connection with the accompanying drawings, wherein like reference characters identify parts of like function throughout the different views thereof:

FIG. 1 is a block diagram of a space diversity signal processing system embodying the present invention;

FIG. 2 is a block diagram of another embodiment of a space diversity combining system;

Figure 3:
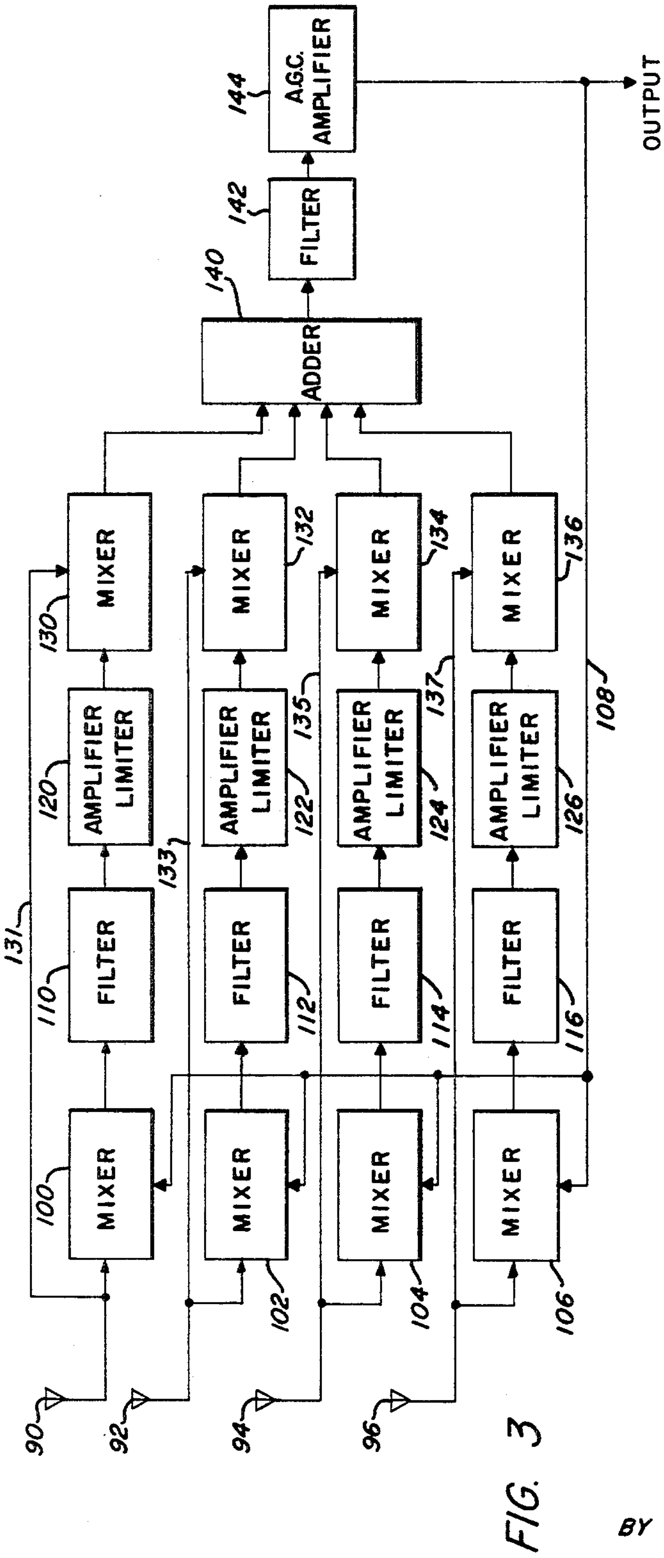
FIG. 3 is a block diagram of further embodiment of a space diversity signal processing system.

Referring to FIG. 1, signals carrying the same intelligence appear at antenna elements 10 and 12 that are separated in space. The transmission paths can be of unequal electrical length from a transmitting source, not shown. The path length differences usually result in differing phase relationships. Each signal received on antennas 10 and 12, at a frequency of 7000 megacycles, for example, is fed to conventional mixers 14 and 16 and heterodyned with the output of local oscillator 18 or a separate local oscillator for each mixer, in order to heterodyne the input signal to approximately 70 megacycles or other intermediate frequencies. The output signals of mixers 14 and 16 preferably are amplified in conventional amplifiers 20 and 22. Stages of radio frequency amplification can be added prior to mixers 14 and 16 and additional intermediate stages may be added where low level input signals are to be received. The output signals from amplifiers 20 and 22 are connected to terminals 24 and 26. It should be understood that signals from antennas 10 and 12 may be sufficiently strong in amplitude so as not to require the use of amplifiers 20 and 22 or at a frequency which does not require heterodyning prior to terminals 24 and 26.

The signals at these terminals, which in the present instance may be a carrier whose amplitude is modulated by information originating at a source, not shown, are fed to conventional mixers 28 and 30. Also connected to these mixers is the output of a common local oscillator 32. When the output of oscillator 32 is mixed or heterodyned with the modulated input signal in mixers 28 and 30, there is produced a pair of intermediate frequency signals from each mixer, representing the sum and difference frequencies of the input signals and the common local oscillator signal. Assuming, for example, a local oscillator signal of 50 megacycles, the output sum and difference signals from mixers 28 and 30 are centered at 20 and 120 megacycles, respectively. The output signals of mixer 28 are applied to frequency selective filters 33 and 34 and the output signals of mixer 30 are applied to frequency selective filters 35 and 36. Filters 33 to 36 are bandpass filters which in the present instance are tuned to the aforementioned sum and difference frequency so as to improve the rejection of unwanted frequencies from mixers 28 and 30. Of course, devices other than bandpass filters may be used to improve the rejection of the unwanted mixer frequencies. For example, band rejection filters may be used to reject all bands except the desired frequencies. The output signals from the filters 33 to 36 preferably are connected, respectively, to amplifiers 37, 38, 39 and 40 to raise the signal level thereby overcoming the loss usually accompanying the prior heterodyning process.

The output of amplifiers 37 and 38 are connected to mixer 42 and the output of amplifiers 39 and 40 are connected to mixer 44. While mixers 28 and 30 are conventional heterodyning or mixing devices, mixers 42 and 44, preferably are of the type in which the output signal amplitude depends in a linear manner upon the amplitudes of both mixer input signals. For example, a conventional pentagrid converter tube with separate signals fed to the two signal grids and operating in a well-known manner as a multiplier can be used. The principles of mixers, well known in the art, are explained in numerous texts including "Applied Electronics" by T. S. Gray, John Wiley and Sons, Inc., 1958, at pages 738–742.

The output signals from mixer 42 contain sum and difference frequency signals which are, in this embodiment, 100 megacycles and 140 megacycles. Bandpass filter 46 is tuned to pass 140 megacycles and bandpass filter 47 is tuned to pass 100 megacycles. In like manner, bandpass filter 48 is tuned to pass 100 megacycles and filter 49 is tuned to pass 140 megacycles, each being connected to the output of mixer 44. Filters 46–49 are conventional RLC filters tuned to the particular sum and difference frequencies so as to improve the rejection of unwanted mixer frequencies. Also, as in the case of the filters 33–36, filtering devices other than bandpass filters may be used.

The 100 megacycle output signal of filter 47 and the 100 megacycle output signal of filter 48 are added in a conventional adder 50, such as a resistance network adder, to provide an output signal having an amplitude proportional to the sum of the input signals. The output signals from filters 47 and 48, as will be described, are substantially in phase and, accordingly, in a novel manner are independent of the relative phases of the input signals on antenna elements 10 and 12. Thus, regardless of the relative phase difference of the incoming signals at antenna elements 10 and 12, it now becomes possible to achieve predetection combining of such signals in a manner which provides coherent or in phase addition of the received signals irrespective of their relative phase at the antenna elements. This addition in phase of such signals is achieved by adder 50 when the phase differences of the incoming signals are substantially removed or, as conveniently termed, isolated in a synthetic manner. Thus, according to the invention, the relative phase of the input signals may be a variable dependent upon electrical path length and as a result of synthetic phase isolation of this device, the output signals from filters 47 and 48 are added substantially in phase. However, while the relative phase of the signals from filters 47 and 48 are independent of the relative input signal phase relationship, they are dependent upon the phase of the common local oscillator 32. Conversely, the relative phase of output signals from filters 46 and 49 are independent of the phase of local oscillator 32, and their relative phase is dependent upon the phase of the input signals at antenna elements 10 and 12, as shown, provided that the same output signal from local oscillators 18 is fed, as shown, to both mixers 14 and 16. An explanation for these phase relationships will be given in connection with the description of the operation of the device.

It should be understood that small phase changes inherent in some individual components in the system which might tend to degrade the output amplitude of signals in adder 50 can be avoided through the use of elements having similar electrical characteristics in filters 33 and 35, 34 and 36, 47 and 48 and 46 and 49 so that minor undesirable phase differences are effectively cancelled. In like manner, small addilive phase changes caused by the amplifiers can be avoided by using similar pairs of amplifiers 37 and 39, 38 and 40, which inherently contain similar phase shifts as well as similar pairs of mixers 28 and 30, 42 and 44 which provide approximately the same phase shift of signals passing therethrough. Of course, minor phase differences of, for example, 30 degrees, can be removed by minor adjustment of the tuning of the RLC filter elements so that the outputs from filters 47 and 48 are completely coherent. When such phase dissimilarities have been substantially adjusted out of the system in this well known manner, the system substantially isolates relative phase differences that may occur in signals at input elements 10 and 12, or at terminals 24 and 26 regardless of whether such differences are caused by the input signals or by other elements connected in the system prior to terminals 24 and 26. Because phase differences in the outputs of filters 47 and 48 detract from the ideal coherent addition of such signals only as the cosine of such phase difference, the selection of components having substantially similar electrical characteristics, provides substantially coherent addition without the aforementioned phase adjustments.

The output signals from adder 50 are fed to demodulator 52 which herein comprises an envelope detector adapted to demodulate amplitude modulation occurring on the input signals. The output signal from demodulator 52 contains signals carrying the intelligence that arrived at spaced antennas 10 and 12.

The principle of operation of the synthetic phase isolator circuit disclosed in FIG. 1 is best understood when the input signal from input element 10 as it appears at terminal 24 is an unmodulated carrier, $A \cos(\omega_1 t+\theta)$. The signal from oscillator 32 is taken as $B \cos(\omega_2 t+\phi)$. The output of mixer 28 is then two signals at the sum and difference frequencies or $KAB$ cos $$[(\omega_1+\omega_2)t+\phi+\theta)]$$

and $KAB \cos[(\omega_1-\omega_2)t+\theta-\phi]$. The amplitude factor K relates to the conversion gain of the mixer. After filtering and amplifying, respectively, in elements 33, 37 and 34, 38 the sum and difference frequency signals applied to mixer 42 can be taken as $E \cos[(\omega_1+\omega_2)t+\theta+\phi]$ and $F \cos[(\omega_1-\omega_2)t+\theta-\phi)$. The difference frequency output of mixer 42 which is selected by filter 47 is $KEF \cos(2\omega_2 t+2\phi)$, and the sum frequency output selected by filter 46 is $KEF \cos(2\omega_1 t+2\theta)$.

In like manner, the signal from input element 12 results in a difference frequency output from mixer 44 which is selected by filter 48 to be the value $KE'F' \cos(2\omega_2 t+2\phi)$ and a sum frequency at mixer 44 which is selected by filter 49 of a value $KE'F' \cos(2\omega_2 t+2\theta')$. The output of adder 50 is proportional to the sum of the signals selected by filters 47 and 48 and is $P[KEF+KE'F'] \cos(2\omega_2 t+2\phi)$ which is substantially $2PKEF \cos(2\omega_2 t+2\phi)$.

A novel aspect of this synthetic phase isolation arrangement is that the signals applied to adder 50 are in phase because the relative input phase angles $\theta$ and $\theta'$ do not appear since they have been cancelled out in the heterodyning process of mixers 42 and 44. Therefore, the phase of the output signal at adder 50 is isolated from the phase associated with the input and thus the phase differences existing between input signals are removed which makes possible predetection combining at adder 50. From inspection of the output of adder 50, as defined in the above equation, it can be noted that the output amplitude is proportional to the amplitudes of the signals from filters 47 and 48 which are directly related to the amplitudes of the input signals at antenna elements 10 and 12 and independent of their phase differences.

To further understand the operation of the receiving system which embodies the synthetic phase isolation technique, the incoming signals can be considered as amplitude modulated carriers received at the antenna elements 10 and 12. This signals as viewed at terminals 24 and 26 can be taken as $A(t) \cos(\omega_1 t+\theta)$ and $A'(t) \cos(\omega_1 t+\theta')$. The sum and difference frequencies following mixers 28 and 30 are $KA(t) \cos[(\omega_1+\omega_2)t+\theta+\phi]$, $KA'(t) \cos[(\omega_1+\omega_2)t+\theta'+\phi]$ and $KA(t) \cos[(\omega_1-\omega_2)t+\theta-\phi]$, $KA'(t) \cos[(\omega_1-\omega_2)t+\theta'-\phi]$. When the sum frequency filters 33 and 35 and amplifiers 37 and 39 pass the sum frequency signals and reject unwanted mixer outputs, the signals applied to mixers 42 and 44 are $EA(t) \cos[(\omega_1+\omega_2)t+\theta+\phi]$ and $E'A'(t) \cos[(\omega_1+\omega_2)t+\theta'+\phi]$. When the difference frequency filters 34 and 36 are sufficiently narrow band so as to pass the carrier and reject the sidebands of the signals, the signals from amplifiers 38 and 40 can be written as $F \cos[(\omega_1-\omega_2)t+\theta-\phi]$ and $F' \cos[(\omega_1-\omega_2)t+\theta'-\phi]$. Thus, these latter signals are of constant amplitude and, while they do not contain the signaling information $A(t)$, the phase of each of these signals has a component, $\theta$ and $\theta'$, respectively, which is dependent upon the phase of its corresponding signal as it appears at terminals 24 and 26. These same phase components are present in the $EA(t) \cos[(\omega_1+\omega_2)t+\theta+\phi]$ and $E'A'(t)[(\omega_1+\omega_2)t+\theta'+\phi]$ signals. In this case, the intelligence is passed through wide band sum frequency filters 33 and 35 and combined with the carrier signals from filters 34 and 36 in mixers 42 and 44, respectively, which yields outputs which are proportional to the amplitudes of the input signals at elements 10 and 12 rather than the squares of such signals. Such narrow band filters can be selected when linear operation is desirable.

This narrow band filter permits the system to employ frequency modulation as a means of communication by similar analysis. As with amplitude modulation, the narrow band filter selects the carrier and rejects the information carrying sidebands. Thus, the drive to the second mixer is as before $F \cos[(\omega_1+\omega_2)t+\theta-\phi]$ and $F' \cos[(\omega_1-\omega_2)t+\theta'-\phi]$. This constant amplitude drive permits linear frequency translations of incoming signals. Predetection combining is achieved as with amplitude modulation.

The difference signal outputs of mixers 42 and 44 is $KFEA(t) \cos(2\omega_2 t+2\phi)$ and $KF'E'A(t) \cos(2\omega_2 t+2\phi)$ which, after filtering by filters 47 and 48, are connected to adder 50. Because these signals have the same angular frequency, $2\omega_2$, and the same relative phase angles $2\phi$, their addition in adder 50 provides the maximum signal voltage at its output. For the case that $F=F'$ and $EA(t)=E'A'(t)$, the output of adder 50 can be written as $2PFEA(t) \cos(2\omega_2 t+2\phi)$, where the factor P includes the mixer loss as well as the filter and adder losses. This adder output signal, $2PFEA(t) \cos(2\omega_2 t+2\phi)$ is fed to demodulator 52 where, by conventional envelope detection, a final output is obtained. This output is obtained. This output is proportional to $A(t)$ which is the signaling information that arrived at antenna elements 10 and 12 of the receiving system. The information from these two antenna elements is thus combined before detection in a manner which results in maximum voltage addition of the signals, even though the incoming information is received having arbitrary phase differences.

In like manner, the sum frequency output of mixers 42 and 44 are $KFEA_t \cos(2\omega_1 t+2\theta)$ and $K'F'E'A'(t) \cos(2\omega_1 t+2\theta')$. After filtering in filters 46 and 49, the filtered sum signals are fed to a conventional adder 51, such as a resistive adder, in which the output is proportional to the vector sum of the input signals. When the amplitudes of the input signals to adder 51 are equal, the output of the adder is proportional to the phase difference of these two input signals, which is also twice the phase difference between the signals received on antenna elements 10 and 12. The resulting antenna directivity pattern, that is voltage output as a function of antenna angle with respect to the incoming signals, is as though antenna elements 10 and 12 were separated by twice their physical distance, thereby affording a relatively sharper directivity pattern for a given pair of antenna elements or antenna arrays.

It should be understood that for convenience FIG. 1 can be said to show a separate signal channel for each antenna element. For example, the first channel may be said to include antenna element 10, mixers 14, 28 and 42 and filters 46 and 47 as well as appropriate amplifiers and filters. The second channel may be said to include antenna element 12, mixers 16, 30 and 44 and filters 48 and 49. These channels work in conjunction with common elements, namely local oscillators 18 and 32, adders 50 and 51 and demodulator 52. Additional channels can be added, their outputs being combined in adder 50 to provide phase isolation of incoming signals on all antenna elements.

From the above equations, the output of a sixteen element synthetic phase processor with equal signal amplitudes and equal channel gain is $16PFEA(t)\cos(2\omega_2 t+2\phi)$ at output of adder 50.

Referring to FIG. 2, another embodiment of a space diversity combining system is illustrated following the principles of this invention. As in the case of the system of FIG. 1, space diversity signals are received on antennas 10 and 12 and amplified in amplifiers 20 and 24 before being fed to conventional mixers or heterodyning devices 28 and 30. In accordance with the principles of this invention, the common local oscillator 32 is connected to mixers 28 and 30 which produces pairs of intermediate frequency signals from each mixer. In the present instance, frequency selective filter 60 which, as in FIG. 1 can be a well known RLC filter, is tuned to the difference frequency output of mixer 28 and a similar frequency selective filter 62 is tuned to the difference frequency output of mixer 30. It should be understood that filters 60 and 62 can be tuned to the sum frequency output of mixers 28 and 30 and the remainder of each channel adapted to operate on the sum frequency. Filters 60 and 62 are incorporated in the circuit to improve the rejection of unwanted mixer frequencies. The output of each of these filters preferably is fed to corresponding amplifiers 64 and 66 for the purpose of amplifying the intermediate frequency signals to a level which results in amplitude limiting by limiters 68 and 70. These limiters are adapted to limit the amplitude of the intermediate frequency signals and can consist of diodes biased to the desired threshold level. The output of limiters 68 and 70 are fed to filters 69 and 71 to further enhance the limiting action and then to mixers 72 and 74 which are linear mixers as described in connection with mixers 42 and 44 of FIG. 1. The other mixer input signal for mixers 72 and 74 is the space diversity signals of amplifiers 20 and 24 which is fed by way of lines 76 and 78 to mixers 72 and 74, respectively. For this arrangement, the input signal for each channel is mixed with its corresponding difference frequency signal which results from the first heterodyne process, and accordingly fewer filters and amplifier components are required than in the arrangement of FIG. 1.

Assuming, for example, an input frequency of 70 megacycles and a local oscillator frequency of 50 megacycles, the difference frequency input to mixers 72 and 74 is 20 megacycles. When this latter frequency is mixed with the input signal of 70 megacycles, the difference frequency output of mixers 72 and 74 becomes 50 megacycles. The output of mixer 72 is fed to a conventional RLC bandpass filter 80 and the output of mixer 74 is fed to a conventional RLC bandpass filter 82, each filter being tuned to 50 megacycles. The output of filters 80 and 82 are fed to a conventional adder 84 which provides a signal which is proportional to the vector sum of the input signals. Because the phase difference between these signals is essentially zero, the vector sum is substantially the sum of the magnitudes of these signals. In this manner predetection combining is achieved.

When amplitude or phase modulated signals are being received and processed, a synchronous demodulator, not shown, can be utilized in the detection system. One input of this synchronous demodulator is the output of adder 84 and the other input is taken from oscillator 32 which, after an appropriate phase delay provides the in-phase reference frequency for the detection process. This coherent demodulator process is possible because the output signal is centered at 50 megacycles which is the frequency of local oscillator 32. The output signal from adder 84 also can be demodulated in a conventional manner.

FIG. 3 shows another embodiment of a synthetic phase isolation system following the principles of this invention. In this embodiment, there is shown a four channel system having a feedback loop in which a portion of the output signal is fed back and applied as the comon source of signals for heterodyning four input signals. In particular, input signals are received at antenna elements 90, 92, 94 and 96 which are coupled to mixers 100, 102, 104 and 106. These mixers preferably are linear mixers as described in connection with the mixers 42 and 44 shown in FIG. 1. The input signal in each mixer is heterodyned with a common source of signals which is applied to the mixers by way of line 108. While in the previous embodiments these heterodyning signals were provided by a local oscillator, in the present case they are derived from the output of the predetection combining of the adder 140. The outputs of mixers 100, 102, 104 and 106 are fed to conventional narrow band RLC filters 110, 112, 114 and 116. With the input signals at 4.5 megacycles and each narrow band filter tuned to 1.3 megacycles, the common source of signals is at 5.8 megacycles.

The outputs of the individual filters 110, 112, 114 and 116 are connected to conventional bandpass amplifier-limiters 120, 122, 124 and 126 which overcome any loss of signal amplitude that may occur in the previous mixer and filter stages. A limiter is included in each amplifier when it is considered desirable to remove excessive amplitude variations or to provide a constant level of drive to mixers following the amplifier-limiter. The outputs of these amplifier-limiters are fed to linear mixers 130, 132, 134 and 136. These mixers are adapted to provide an output which is proportional to the amplitudes of both input signals for each mixer. In addition to the signals from amplifier-limiters 120, 122, 124 and 126, the respective input signals from each antenna element is fed to the latter mixers by way of lines 131, 133, 135 and 137. The outputs of each of the mixers 130, 132, 134 and 136 are summed or combined in a conventional adder 140, such as a resistive adder.

The common output of adder 140 is fed to filter 142 which is tuned to the sum frequency, in this case 5.8 megacycles. This filter is a conventional RLC filter which improves the rejection of unwanted mixer output signals. The frequency selected output of filter 142 is amplified by amplifier 144 which in this case is a conventional automatic gain control AGC amplifier. The AGC characteristic is such as to maintain the level to mixers 100, 102, 104 and 106 at a level that is substantially constant in the presence of variations in input signal levels at antenna elements 90, 92, 94 and 96.

Figure 4:
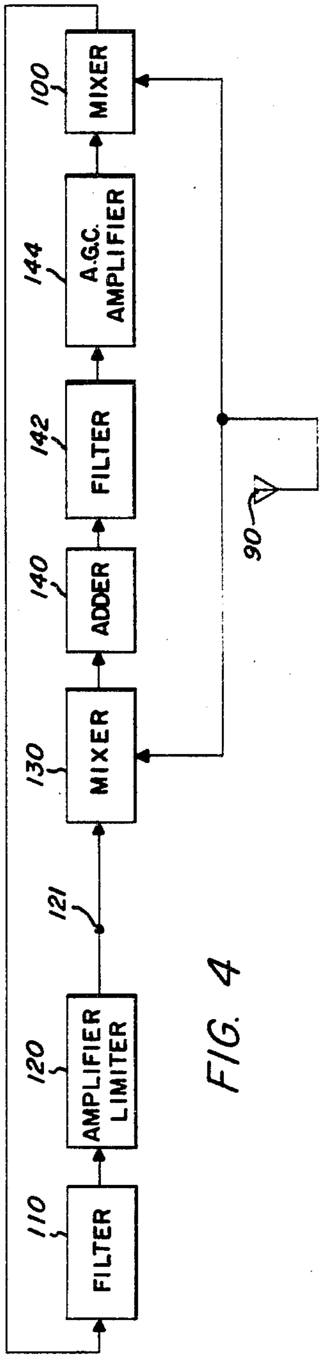
FIG. 4 is a block diagram of one channel of the system of FIG. 3 arranged in a manner to aid in the description of the operation of this embodiment of the invention.

In order to faciltate the explanation of the operation of the system, FIG. 4 shows a portion of the elements of FIG. 3 drawn in a manner that presents the regenarative loop elements in an arrangement that can be readily seen to be a feedback oscillator circuit. The narrow band filter 110 and amplifier-limiter 120 are arranged to form an oscillator. Where filter 110 primarily determines the frequency of oscillation, the amplifier-limiter 120 provides sufficient gain for regeneration and the limiting action inherent in an oscillator and also determines the level at terminal 121. For a conventional oscillator, the output of amplifier-limiter 120 at terminal 121 would be returned to filter 110 to provide a feedback loop which, when the magnitude and phase of the loop gain are sufficient, results in regeneration and provides oscillatory characteristics. However, in the configuration of FIG. 4, the signal at terminal 121 is heterodyned by the input signal from antenna element 90. The sum frequency signal is selected by filter 142 and amplified and then heterodyned again by the input signal in mixer 100. This process can be thought of as first adding and then subtracting the information from antenna element 90. This addition and subtraction process results in the signal from mixer 100 being substantially the same as the signal at terminal 121. More accurately, the action of mixer 100 is described as a correlator or linear multiplier and the signals fed to it are substantially the same but of differing center frequency. The correlation process results in a strong output at the difference frequency. Thus, the signal fed back to filter 110 is substantially the same as that at terminal 121 for purposes of providing feedback for the oscillatory characteristic. This output of mixer 100 is returned to filter 110 resulting in oscillatory performance that is similar to the conventional feedback oscillator previously described.

Referring now to FIG. 3, a multiplicity of narrow band filters and amplifier-limiters are arranged to form a plurality of regenerative feedback loops by way of common elements 140, 142 and 144. The filters 110, 112, 114 and 116 are tuned to the same frequency, in this case 1.3 megacycles. Further, the gain of the regenerative feedback loop is a maximum when the signals fed to adder 140 are in phase since this results in adding the magnitude of the signals.

Since mixers 100, 102, 104 and 106 are being fed by a common signal from line 108, and the same input signal frequencies are being received on the four antenna elements 90, 92, 94 and 96, which may have varying phase relationships, the difference frequency outputs of the four mixers are also the same frequency. The relative phase of these mixer output difference frequency signals are of the same number of degrees as the relative phase of the input signals on the aforementioned antenna elements, however, of opposite sense or sign. Since the filter-amplifier combination of each of the four branches have substantially the same electrical characteristics, the signals feeding mixers 130, 132, 134 and 136 from their associated amplifiers retain this same relative phase. The input signals from the antenna elements 90, 92, 94 and 96 are also applied to their respective mixers 130, 132, 134 and 136. The sum frequency outputs of these mixers are of the same phase, that is their phase relationships are substantially zero, because the output relative phase of said mixers results from the addition of two equal and opposite relative phase relationships. Accordingly, the signals entering adder 140 are substantially in phase even though the signals at the antenna elements may be of varying phase. Further, the aforementioned regenerative loops oscillate at the same frequency since, as shown, heterodyning of the common signal input on line 108 and the respective antenna input signals in mixers 100, 102, 104 and 106 results in the same frequency being selected by filters 110, 112, 114 and 116 when these filters are tuned to substantially the same frequency.

In order to add signals before detection, often called predetection combining, each of which have the same information content, the relative phase of these signals, as noted, must be substantially zero during the addition process. The relative phase of these predetected signals is made zero by synthesizing or generating for each incoming signal, a synthetic having a phase that is equal to but opposite from that of an incoming signal. The heterodyning of each of these synthesized signals with incoming signals, as occurs in mixers 120, 132, 134 or 136, produces resultant signals that have the same phase and are therefore isolated from the incoming signals. The synthesized signals are generated by mixing a common signal with each of the incoming signals. This signal processing is termed synthetic phase isolation.

The operation of FIG. 3 in connection with input signals which are devoid of carriers can be better understood by recalling that mixers 100, 102, 104 and 106 are correlators or multipliers. The input signal information at 4.5 megacycles is the same from each antenna element and substantially the same information is on line 108, however, at a different center frequency, 5.8 megacycles. The correlation of signals with substantially the same information but with different center frequencies results in a strong signal or correlation spike at the difference frequency. The signal energy resulting from the correlation is centered primarily at 1.3 megacycles, which is the frequency at which the regenerative loops oscillate as determined by filters 110, 112, 114 and 116. This correlator output signal is predominantly at 1.3 megacycles, whether or not the information signal has a carrier. Thus, FM signals whose modulation index is such that the carrier power is zero can be processed in this type predetection combiner. Further, it is possible to introduce a signal whose chractreistics are the same as band-limited noise and to provide predetection combining of a multiplicity of these signals. In addition to providing filters 110, 112, 114 and 116, which have a Q high enough to maintain stable oscillation in the regenerative feedback loop, it is also deirable to select filter 142 of a sufficiently broad bandwidth that the waveform is not distorted in amplitude or phase which would tend to reduce the correlator output. In general, then, the bandwidth of filter 142 is selected to be large compared to the bandwidth of the signal. In some cases, particularly where the bandwidth of this signal is not small compared to the center frequency, there may be undesirable time and phase delays in the paths from mixers 130, 132, 134 and 136 to mixers 100, 102, 104 and 106, which tend to reduce the correlator outputs. It should be understood that these time and phase delays can be compensated, in a known manner, by filters and delay lines, not shown, which introduce similar time and phase delays to the antenna signals at the input to mixers 100, 102, 104 and 106. However, this compensation should not be added to the antenna signals as applied to mixers 130, 132, 134 and 136.

As previously noted, the amplitude of the regenerative oscillation is restricted by amplifier-limiter 120 and the average output held constant by AGC amplifier 144. Stable loop oscillations are also obtained when amplifier 120 is linear and the AGC action of amplifier 144 maintains the regenerative loop gain at unity. In the case where the limiting element of the regenerative loop is not located in the branch circuits, the combining action changes from linear to ratio squared. Ratio squared combining results in the maximum output signal-to-noise ratio irrespective of the individual input singal-to-noise ratios when the noise powers in each of the antenna channels are equal. The output of each correlator is proportional to the product of the respective carrier or signal voltage received and the common signal of line 108 which is held constant by AGC action. The amplitudes of respective signals applied to adder 140 are proportional to their respective correlator output times the respective signal voltage which means this output is proportional to the square of the respective input signals.

While FIG. 3 shows amplifier 144 as an AGC amplifier which maintains the output level substantially constant, amplifier 144 can be a linear amplifier whose output is maintained at a constant level by providing a separate AGC amplifier in each antenna signal input line.

As shown in FIG. 3, the difference frequency provided by the correlators is selected by their respective filters and the sum frequency provided by the mixers which feed adder 140 is selected by the common filter 142 following the adder. It should be understood, however, that the sum frequency can be selected by the filters following the correlator and the difference frequency selected by filter 142 following the adder. Also, individual filters, not shown, feeding adder 140 could be used in place of filter 142 to select the appropriate sum or difference frequency.

Figures 5, 6:
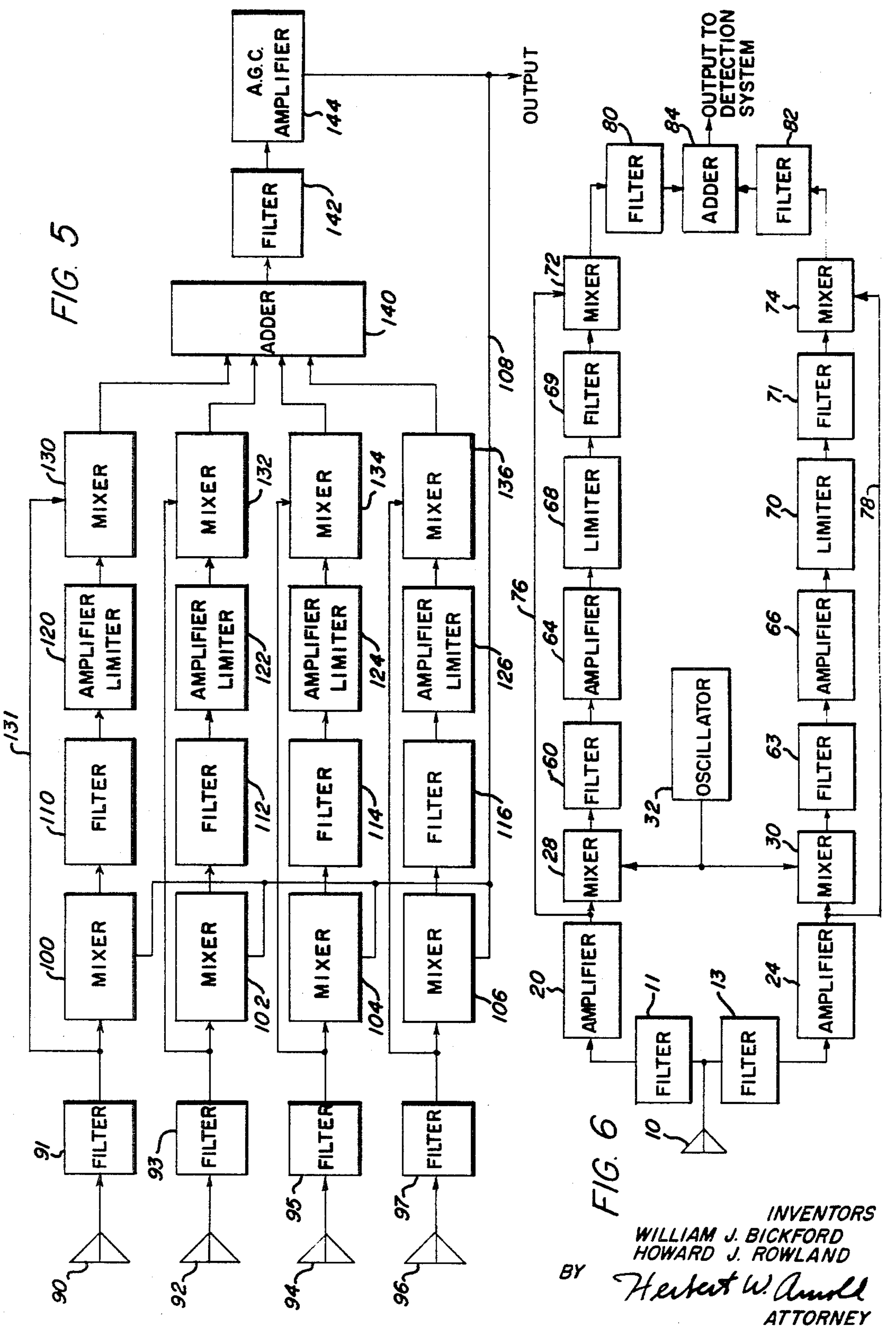
FIG. 5 is a block diagram of a modification of the system shown in FIG. 3 adapted for the reception of frequency diversity signals.
FIG. 6 is a block diagram modification of the system shown in FIG. 2 adapted for the reception of frequency diversity signals.

Referring now to FIG. 5, there is shown an embodiment of the invention which can be used for the reception of frequency diversity transmissions. The signals arriving at antenna elements 90, 92, 94 and 96 carry the same information. However, each of these signals has a separate center frequency, which, for example, in this embodiment is 5.3 megacycles, 4.9 megacycles, 4.5 megacycles and 4.1 megacycles, respectively. Filters 91, 93, 95 and 97 are tuned to pass these respective signal frequencies which are applied to their respective mixers 100, 102, 104 and 106 in the manner shown in FIG. 3. Again, as shown in FIG. 3, the common signal on line 108, at 5.8 megacycles, correlates with these signals in correlators or mixers 100, 102, 104 and 106. The difference signal output from these mixers is predominantly at 0.5 megacycle, 0.9 megacycle, 1.3 megacycles and 1.7 megacycles, respectively. The center frequency of each of these signals is selected by the filters prior to being amplified and applied to mixers 130, 132, 134 and 136 in the manner shown in FIG. 3. The outputs to adder 140 are similarly of the same frequency of 5.8 megacycles and in phase, thus, predetection combining results. Unlike FIG. 3, however, the four regenerative loops shown in FIG. 5 have branches which carry signals at different center frequencies. Thus, rather than tuning filters 110, 112, 114 and 116 to identical frequencies, these filters or frequnecy determining elements are tuned respectively to .5, .9, 1.3 and 1.7 megacycles which results in identical sum frequencies in the common elements 140, 142 and 144. Further, the tuning of these filters to their respective frequencies achieves synthetic phase isolation and provides in-phase addition of the signals at adder 140. It should be understood that the respective input signals of antenna elements 90, 92, 94 and 96 could, if desired, be heterodyned to the same frequency by four local oscillators. These signals could then be used in the configuration of FIG. 3, wherein each filter 110, 112, 114 and 116 is tuned to the same frequency.

The circuit shown in FIG. 6 is similar to that shown in FIG. 2 except that it is adapted for reception of frequency diversity transmissions. The single antenna 10 provides two signals, in this case at 70 and 75 megacycles, which frequencies are selected by adjustment of frequnecy determining elements or filters 11 and 13 before amplification by amplifiers 20 and 24, respectively. The heterodyning of these signals with the common oscillator signal at 50 megacycles, provides difference frequencies of 20 and 25 megacycles, respectively. These difference frequency signals are then selected by filters 60 and 63. In the manner shown in FIG. 2, the outputs of mixers 72 and 74 of FIG. 6 are at the same frequency as oscillator 32 and their relative phase is substantially zero. Similarly, the vector addition of these selected outputs from filters 80 and 82 is substantially in phase addition or magnitude addition of the signals. The essential difference between FIG. 6 and FIG. 2 is the frequency to which the filters are tuned. In the case of FIG. 6, the incoming signals are separated by 5 megacycles, thus filters 11 and 13 as well as 60 and 63 and 69 and 71 are separated in frequency by 5 megacycles. The result is that the output is at the same frequency, namely that of oscillator 32 or 50 megacycles. Thus predetection combining of signals of different frequencies is achieved.

Figure 7:
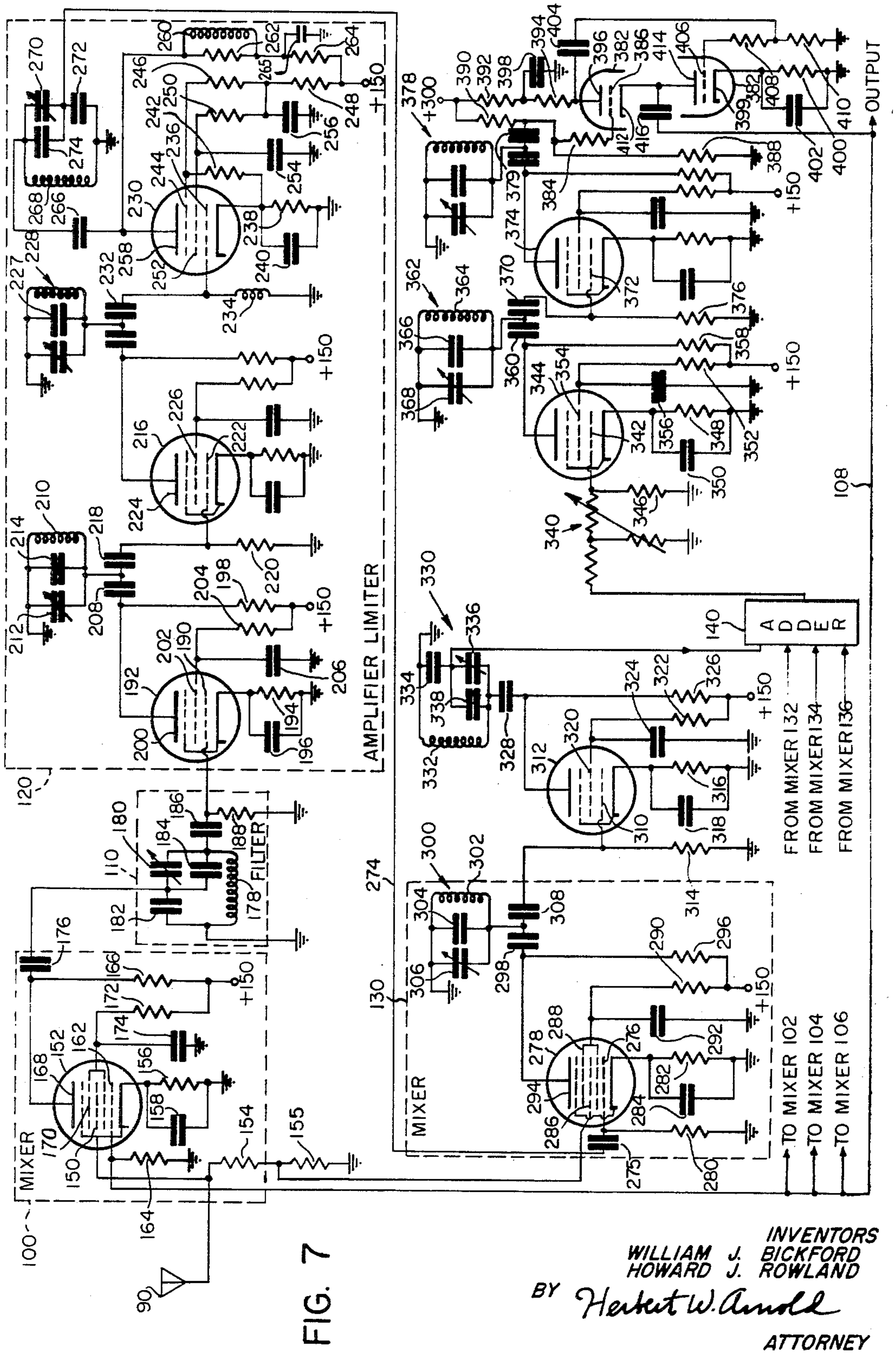
FIG. 7 is a schematic diagram of a portion of the system of FIG. 3.

FIG. 7 illustrates an example of a circuit suitable for practicing the invention. In particular, FIG. 7 is a schematic diagram of an embodiment of the invention similar to that shown in FIG. 3. However, for convenience a single channel and common adder, filter and AGC amplifier are shown included in a regenerative feedback loop. As shown in FIG. 7, a signal from antenna element 90 is fed to a control grid 150 of a 6BE6 type tube 152 in mixer or correlator 100. Included in the input circuit is a 51 ohm input resistance comprised of a 24 ohm resistor 154 and a 27 ohm resistor 155. The cathode of tube 152 is biased by a 120 ohm resistor 156 in connection with a .01 microfarad capacitor 158. The signal over line 108 which is taken from the output voltage is applied to control grid 162 by way of 51 ohm input resistor 164. A B+ voltage of 150 volts is applied through a 3600 ohm load resistor 166 to the plate 168 of the 6BE6 tube. The screen grid 170 is connected to the 150 volt source by way of 12,000 ohm resistor 172 bypassed by a .01 microfarad capacitor 174. As noted, mixer 100 is a linear mixer in which the input signal is heterodyned with the signal on line 108.

The output of mixer 100 is fed by way of a .01 microfarad coupling capacitor 176 to a narrow band RLC filter 110 which is tuned to 1.3 megacycles and comprises a 66 microhenry inductance 178 across which is coupled a 7–45 micromicrofarad variable capacitor 180 in series with a 1000 micromicrofarad capacitor 182. A 240 microfarad capacitor 184 is connected in parallel with variable capacitor 180. The output of filter 110 is fed by way of a .01 microfarad coupling capacitor 186 and a 100,000 ohm input resistor 188 to the control grid 190 of a 6CB6 type tube 192 which comprises the first stage of the three stage amplifier-limiter 120. The cathode of tube 192 is biased by a 180 ohm bias resistor 194 across which is coupled a .01 microfarad capacitor 196. A voltage source of 150 volts is applied to a 3300 ohm load resistor 198 to the plate or anode 200 of tube 192. Also connected to the voltage source is screen grid 202 by way of a 10,000 ohm screen resistor 204 bypassed by a .01 microfarad capacitor 206. The output of the first stage amplifier tube 192 is coupled by way of a .01 coupling capacitor 208 to an LC tuned circuit comprising a 66 microhenry inductance 210 across which is coupled a 50–280 micromicrofarad variable capacitor 212 and an 82 micromicrofarad capacitor 214. This circuit tunes the output of the amplifier stage to the desired frequency of 1.3 megacycles. The input circuit to the second stage which is a 6CB6 amplifier tube 216 consists of a .01 microfarad input capacitor 218 and a 110,000 ohm input resistor 220, the common junction of which is connected to control grid 222 of tube 216. The cathode bias resistor and capacitor for this tube are of the same values as tube 192. A source of 150 volts is applied to the plate 224 and to the screen 226 of tube 216 through resistors having the same values as those in the first stage. Also, the coupling capacitors and LC tuning circuit 228 have the values corresponding to those shown in connection with the first stage of amplifier 120 except that capacitor 227 has a value of 120 micromicrofarads. This tuning circuit is tuned in like manner to 1.3 megacycles.

The third stage of amplifier 120 comprises a 6AS6 type tube 230 connected to operate as an amplifier-limiter. The input coupling circuit for this stage is a .01 microfarad capacitor 232 in series with a 1 milhenry inductance 234 the common junction of which is connected to control grid 236. The cathode bias for the limiter tube comprises a 560 ohm cathode resistor 238 across which is connected a .01 microfarad capacitor 240. The cathode of tube 230 is also connected by way of a 1000 ohm coupling resistor 242 to a suppressor electrode 244 which also is connected to a source of 150 volts by way of a 20,000 ohm resistor 246 in series with a 1000 ohm resistor 248. From the mid point of these resistors a 2400 ohm resistor 250 is connected to screen grid 252 of tube 230 which is bypassed by a .01 microfarad capacitor 254. A .01 microfarad capacitor 256 is connected from ground to the juncture of resistors 246, 248 and 250. In like manner, the plate electrode 258 of tube 230 is coupled to a source of 150 volts by way of a 1 milhenry inductance 260 across which is connected 3,300 ohm resistor 262. Inductance 260 is in series with a 47,000 ohm load resistor 264 which is bypassed by a 0.01 microfarad capacitor 265. This inductance 260 is for the purpose of providing a low direct current voltage drop between the plate 258 and the decoupled voltage source at the junction of resistor 264 and capacitor 265. Also connected to the output of tube 230 is a coupling capacitor 266 feeding a tuning circuit comprising a 66 microhenry inductance 268 across which is connected a 50–280 micromicrofarad variable capacitor 270 in series with a 2200 micromicrofarad capacitor 272. Also connected across capacitor 270 is a 91 micromicrofarad capacitor 274. This circuit, in like manner, is peaked to 1.3 megacycles. The output of this circuit is coupled by way of line 274 and a 470 micromicrofarad coupling capacitor 275 to a control electrode 276 of a 6BE6 tube 278 in mixer or multiplier 130. A 20,000 ohm resistor 280 is connected in the input circuit to ground and the cathode of tube 278 is biased by means of a 120 ohm resistor 282 across which is connected a .01 microfarad bypass capacitor 284. Also connected to the input of linear mixer 130, which, as noted, is adapted to provide an output proportional to the amplitude of both input signals is an input signal from antenna 90 which is fed from the junction of resistors 154 and 155 to electrode 286 of tube 278. Of course, where it is desirable to increase the amplitude of input signals from antenna 90, an amplifier can be included following each antenna. A source of 150 volts is applied to screen electrode 288 by way of 12,000 ohm resistor 290 which is bypassed by .01 microfarad capacitor 292. The anode 294 of tube 278 is connected to the 150 volt source through 3600 ohm load resistor 296.

The output of tube 278 is connected by way of a .01 microfarad coupling capacitor 298 to an LC peaking circuit 300 tuned to 5.8 megacycles comprising a 4.7 microhenry inductance 302 across which is a 120 micromicrofarad capacitor 304 and a 7–45 micromicrofarad variable capacitor 306. This circuit 300 is tuned to 5.8 megacycles. The output of mixer 130 is coupled by way of a .01 coupling capacitor 308 to the control grid 310 of a 6CB6 type amplifier tube 312. While tube 312 and its associated peaking circuitry 332 is not described in connection with FIG. 3, this circuit may be considered as an auxiliary amplifier or input to the adder 140 and is used to insure the input signal drive to the adder is of sufficient amplitude. The input resistor for tube 312 is a 110,000 ohm resistor 314. The cathode of tube 312 is biased with 180 ohm resistor 316 and a .01 microfarad bypass condenser 318. A source of 150 volts is applied to screen electrode 320 by way of a 10,000 ohm resistor 322 which is bypassed by a .01 microfarad capacitor 324. The anode of tube 312 is also connected to the 150 volt source through a 3600 ohm load resistor 326. The output of tube 312 is fed by way of a .01 microfarad coupling capacitor 328 to a peaking circuit 330 which comprises a 4.7 microhenry inductance 332 across which is connected a 1600 micromicrofarad capacitor 334 in series with a 7–45 micromicrofarad variable capacitor 336 in parallel with a 150 micromicrofarad capacitor 338. This circuit is peaked to 5.8 megacycles. The output of peaking circuit 330 is coupled directly to adder 140 in a manner similar to that in which channels from mixers 132, 136 and 138, as seen in FIG. 3, are coupled to adder 140. Since the input signals from the four channels to adder 140 are tuned to the same frequency, inasmuch as the filters 110, 112, 114 and 116 are tuned to the same frequency and are substantially in phase, a signal is derived which is proportional to the sum of the magnitudes of these input signals. The output of adder 140 is connected to a gain control and amplifier filter circuit which is similar to filter 142 and AGC amplifier 144 with the exception that the gain is manually controlled by means of a variable attenuator 340. While this attenuator is useful to control the input level to the following circuitry, it should be understood that a conventional AGC amplifier as shown in FIG. 3 may be substituted. Thus, the 5.8 megacycle output from the adder 140 is applied directly to the control grid 342 of a 6CB6 amplifier tube 344 by way of variable attenuator 340. Control grid 342 is connected to a 51 ohm input resistor 346. Tube 344 is biased with a 270 ohm cathode bias resistor 348 and bypassed by a .01 microfarad capacitor 350. A source of 150 volts is applied through a 10,000 ohm resistor 352 to a screen 354 of tube 344. Resistor 352 is bypassed by a .01 microfarad capacitor 356. The plate or anode of tube 344 is also connected to the source of 150 volts by way of a 3300 ohm load resistor 358.

The output of tube 344 is coupled by way of a 0.1 bypass capacitor 360 to an LC filter circuit 362 corresponding to filter 142 of FIG. 3. This filter circuit is tuned to 5.8 megacycles and comprises a 4.7 microhenry inductance 364 to which is connected a 120 micromicrofarad capacitor 366 and a 7–45 micromicrofarad variable capacitor 368. The output of this filter is connected by way of a .01 microfarad coupling capacitor 370 to the control grid 372 of a second 6CB6 tube 374. The control grid is also connected to a 100,000 ohm input resistor 376. This additional stage of amplification and filtering is used to raise the signal to a desired level for regenerative feedback purposes. Tube 374 is biased in the same manner as tube 344 and a 150 volt source is coupled to the anode and screen elements by means of components having the same value as used in connection with tube 344. The output of tube 374 is also fed to a filter circuit 378 which uses components of the same value as filter 362 in both inductance and capacitance. Filter 378 is tuned to 5.8 megacycles and its output is fed by way of a .01 microfarad coupling capacitor 379 to a cathode follower output circuit 380 comprising a dual triode 6DJ8 type tube 382. The output of coupling capacitor 379 is connected by way of a 47 ohm resistor 384 to a control grid 386 of tube 382 and to the junction of a 470,000 ohm input resistor 388 and a 470,000 ohm resistor 390 coupled to a direct current source of 300 volts, thus forming a voltage divider circuit to bias the control grid 386. The source of 300 volts is also connected by way of a 1100 ohm decoupling resistor 392 in series with another 1100 ohm resistor 394 connected to anode 396. The common juncture of resistors 392 and 394 is bypassed with a .1 microfarad capacitor 398. The cathode 399 of tube 382 is biased by means of a 150 ohm resistor 400 and a .01 capacitor 402. Anode 396 is connected by way of a .01 microfarad capacitor 404 to control grid 406 by way of a 47 ohm resistor 408 and a 51,000 ohm input resistor 410. The cathode 412 is tied directly to anode 414 and the output is taken by way of a .01 capacitor 416. This output constitutes the output of the synthetic phase isolator as well as a feedback signal which is applied to grid 162 of mixer 100 by way of feedback line 108.

This feedback voltage is also connected to the input of mixers 102, 104 and 106 of the other three channels as shown in FIG. 3. The tubes 344, 374 and 382 and the associated filter circuitry provide an amplifier filter in which the sum frequency signal is selected and amplified.

The description of the signal combining properties of FIG. 7 have been described in connection with FIG. 3. Accordingly, the information received on antenna element 90 and on elements 92, 94 and 96, not shown in FIG. 7, is coherently combined in adder 140 and appears at the output of capacitor 416 as a composite signal.

It should be understood that the circuits shown herein can be modified as by substituting semiconductor devices for tubes.

This invention is not limited to the particular details of construction, materials and processes described as many equivalents will suggest themselves to those skilled in the art. Accordingly, it is desired that this invention not be limited to the particular details of the embodiments disclosed except as defined by the appended claims.

What is claimed is:

1. A signal processing system comprising means to receive a plurality of input signals, said input signals having an unknown and varying phase relationship relative to each other, separate signal supplying means, means to heterodyne the output of said separate signal supplying means with each of said input signals to provide for each input signal a pair of sum and difference beat frequency signals, means for heterodyning one signal of each pair of said beat frequency signals with the other signal of that pair to provide for each beat frequency signal pair, a second pair of sum and difference beat frequency signals, and means for combining the difference beat frequency signals of each second pair to provide an output signal the phase of which is substantially independent of the phase of said input signals.

2. A signal processing system comprising means to receive a plurality of input signals, said input signals having an unknown and varying phase relationship relative to each other, separate signal supplying means, means to heterodyne the output of said separate signal supplying means with each of said input signals to provide for each input signal a pair of sum and difference beat frequency signals, means for heterodyning one signal of each pair of said beat frequency signals with its corresponding input signal to provide for each input signal, a second pair of sum and difference beat frequency signals, and means for combining the difference beat frequency signal of each second pair to provide an output signal the phase of which is substantially independent of the phase of said input signals, means for amplifying said output signal, the output circuit of said amplifying means including a feedback path in which an unlimited, amplified output signal is directly applied as said separate signal supplying means.

3. A system according to claim 2 in which the receiving means includes a plurality of antenna means.

4. A system according to claim 2 in which the receiving means includes antenna means and means connected thereto for selecting individual input signals.

5. In combination, means for receiving input information signals of varying relative phase, means including heterodyning, combining and filtering means serially connected to said receiving means for providing output signals containing said information and with the relative phase of the output signals substantially independent of said input signals, and feedback means fed by said output signals including a regenerative loop including means for correlating said information containing signals with said input signals.

6. A system comprising means for providing a plurality of input signals of varying phase from antenna elements, a plurality of linear signal amplifiers connected to amplify said input signals, a regenerative feedback loop connected from the output of said amplifiers to provide oscillations, means included in said regenerative feedback loop for heterodyning said amplified input signals with said oscillations to provide output signals, means for summing said output signals to provide a combined linear signal, means for correlating each of said input signals with said combined linear signal, and means for deriving a final output signal from said combined linear signal.

7. A system according to claim 6 in which said means for correlating each of said input signals comprises signal mixing means.

8. In combination, means for accepting a plurality of input signals of varying phase, regenerative feedback loops including frequency determining means, means for progressively multiplying and heterodyning said input signals with loop signals in said regenerative feedback loops to provide signals of the same phase having substantially the same characteristics as said input signals, and means for summing said signals of the same phase to provide linear summed loop signals, said latter signals being coupled to said multiplying means.

9. A combination according to claim 8 in which the regenerative feedback loops include linear amplifying means.

10. In combination, means for accepting a plurality of input signals of varying phase, a plurality of regenerative signal loops including a plurality of branch circuits and a common feedback circuit including linear amplifying means, each branch circuit including frequency determining means and heterodyning means for progressively correlating and mixing said input signals with loop signals, and means for summing the outputs of each branch circuit to provide said loop signals flowing through said common feedback circuit to said branch circuits.

References Cited

UNITED STATES PATENTS 2,683,213 7/1954 Earp ---------------- 325—305

KATHLEEN H. CLAFFY, Primary Examiner

CHARLES JIRAUCH, Assistant Examiner

U.S. Cl. X.R.

325—345, 476; 328—155

UNITED STATES PATENT OFFICE

CERTIFICATE OF CORRECTION

Patent No. 3,471,788 October 7, 1969

William J. Bickford et al.

It is certified that error appears in the above identified patent and that said Letters Patent are hereby corrected as shown below:

Column 5, line 15, "addilitive" should read -- additive --; line 58, "F cos $[(\omega_1-\omega_2)t+\theta-\phi)$" should read -- F cos $[(\omega_1-\omega_2)t+\theta-\phi]$ --. Column 6, line 48, "F cos $[(\omega_1+\omega_2)t+\theta-\phi]$' should read -- F cos $[(\omega_1-\omega_2)t+\theta-\phi]$ --; line 65, cancel "This output is obtained.". Column 8, line 28, "comon" should read -- common --. Column 10, line 5, after "synthetic" insert -- signal --.

Signed and sealed this 5th day of January 1971.

(SEAL)
Attest:

Edward M. Fletcher, Jr.
Attesting Officer

WILLIAM E. SCHUYLER, JR.
Commissioner of Patents